United States Patent
Chen et al.

(10) Patent No.: US 7,387,505 B1
(45) Date of Patent: Jun. 17, 2008

(54) SIDE-ACTION MECHANISM AND INJECTION MOLD USING THE SAME

(75) Inventors: Chih-Yu Chen, Tu-Cheng (TW); Jian-Guang Huang, Tu-Cheng (TW); Yun-Ging He, Tu-Cheng (TW); Chun-Yan Wu, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 28 days.

(21) Appl. No.: 11/603,826

(22) Filed: Nov. 24, 2006

(51) Int. Cl.
*B29C 33/44* (2006.01)
*B29C 45/33* (2006.01)

(52) U.S. Cl. ............... 425/190; 425/577; 425/DIG. 58

(58) Field of Classification Search ............... 425/190, 425/192 R, 577, DIG. 58, 450.1, 451, 451.7, 425/451.9
See application file for complete search history.

(56) References Cited

U.S. PATENT DOCUMENTS

| | | | | |
|---|---|---|---|---|
| 3,049,759 A * | 8/1962 | Eberhardt | ................... | 425/438 |
| 4,768,747 A * | 9/1988 | Williams et al. | ............... | 249/63 |
| 4,889,480 A * | 12/1989 | Nakamura et al. | .......... | 425/577 |
| 4,902,212 A * | 2/1990 | Nakamura et al. | .......... | 425/107 |
| 4,923,388 A * | 5/1990 | Nakamura | ................... | 425/577 |
| 5,587,189 A * | 12/1996 | Niimi | .......................... | 425/577 |
| 6,109,908 A * | 8/2000 | Ikehara et al. | .............. | 425/545 |
| 6,116,891 A * | 9/2000 | Starkey | ....................... | 425/556 |
| 6,171,094 B1* | 1/2001 | Von Holdt | ................... | 425/190 |
| 6,537,053 B1* | 3/2003 | Watkins | ....................... | 425/190 |
| 7,175,421 B2* | 2/2007 | Takemoto et al. | .......... | 425/577 |
| 2004/0247726 A1* | 12/2004 | Takemoto et al. | .......... | 425/190 |
| 2007/0141193 A1* | 6/2007 | Suga | .......................... | 425/437 |
| 2007/0148281 A1* | 6/2007 | Tu | .............................. | 425/589 |
| 2007/0172539 A1* | 7/2007 | Wang et al. | ................ | 425/577 |

* cited by examiner

*Primary Examiner*—James P. Mackey
*Assistant Examiner*—Seyed Masoud Malekzadeh
(74) *Attorney, Agent, or Firm*—Rosenberg, Klein & Lee

(57) ABSTRACT

A side-action mechanism disclosed in the present invention includes a slide carrier, an insert core, and a core pin engaged with the slide carrier. The slide carrier has an angular slide groove perforating through the slide carrier and an opening formed and making communication between a front surface and the bottom surface with a slide way defined on its top. The insert core which is accommodated in the angular slide groove has a secured portion and an angular insert portion extending downwards from the secured portion. The core pin has a body which is small enough to be accommodated in the opening, but long enough to protrude out of the opening. The body at one end defines a pair of ears thereof for engaging with the slide way so that the core pin can slide along the slide way.

6 Claims, 8 Drawing Sheets

SIDE-ACTION MECHANISM AND INJECTION MOLD USING THE SAME

BACKGROUND OF THE INVENTION

1. Field of the Invention

The present invention relates to a plastic injection mold, and more particularly, to a side action mechanism of the injection mold.

2. The Related Art

In injection molding, upper and lower mold halves are brought together to define a mold cavity into where heated molten plastic is injected under pressure. The mold halves are typically vertically aligned with an upper mold portion termed the cavity half and a lower mold portion termed the core mold half. For forming holes or apertures or undercut through sides or on other location of molded pieces, side action mechanism are provided which are projected into the molding cavity as the mold halves are closed and which must be retracted from the cavity as the mold is opened and before ejection of the part can take place.

A conventional side-action mechanism 90a shown in FIG. 9 includes an insert core 91a and a side core 92a. The insert core 91a further includes a secured portion 911a, an insert portion 912a extending slantingly from the secured portion 911a. The side core 92a which cooperates with the insert core 91a further has a slide portion 921a with a slide groove 924a defined therein. The slide groove 924a is used for accommodating the insert portion 912a paralleling to the insert core 912a. An arm 922a extends forwards from the slide portion 921a and further defines a core element 923a at its free end. When the injection mold is closed, the insert portion 912a is fully inserted in the slide groove 924a, and the core element 923a is put in a mold cavity. At the open process of the injection mold, the insert portion 912a withdraws from the slide groove 924. At the same time, the core element 923a is retracted from the mold cavity.

One problem with current side-action mechanism is that the angle between the insert core 91a and the side core 92a is too big. As a result, the closing and opening forces of the mold by the press are relatively great and create great frictional resistance between the slide groove 924a and the insert core 912a. The insert core may not be able to overcome the frictional resistance before it fails. Accordingly, there is a need for a side-action mechanism which is more forgiving in terms of the tolerances required for trouble-free operation side-action mechanism.

SUMMARY OF THE INVENTION

Accordingly, an object of the present invention is to provide a side-action mechanism to overcome the disadvantage of the prior art.

The side-action mechanism disclosed in the present invention includes a slide carrier, an insert core, and a core pin engaged with the slide carrier. The slide carrier has an angular slide groove perforating through the slide carrier and an opening formed and making communication between a front surface and the bottom surface with a slide way defined on its top. The insert core which accommodated in the angular slide groove has a secured portion and an angular insert portion extending downwards from the secured portion. The core pin has a body which is small enough to be accommodated in the opening, but long enough to protrude out of the opening. The body at one end defines a pair of ears thereof for engaging with the slide way so that the core pin can slide along the slide way.

Another object of the present invention is to provide an injection mold using the side-action mechanism according to the present invention.

The injection mold which accommodates the side-action mechanism includes a core half and a cavity half cooperating with the core half. The cavity half further includes a top clamping plate and a cavity plate. The cavity plate has a mold cavity defined therein and a recess formed at one end of the cavity plate for accommodating the side-action mechanism. The recess includes a bottom plane. Two limited girders are defined on both edges of the bottom plane. Two wedge portions are embedded in the recess adjacent to the upper portion of the slide carrier and rides upon the slide bar and the limited girder. A hole formed between the mold cavity and the recess is big enough to allow the insert core to go therethrough. In addition, the space between two limited girders snugly fit the slide carrier and the slide carrier is restricted by the limited girders. Therefore, the slide carrier could only move along the recess. The core pin goes through the hole and put a core element in the mold cavity.

The resistance between the slide carrier and the insert core has been reduced by the cooperation of the insert core, the slide carrier and the core pin. As a result, the insert core is easy to be inserted into and withdrew from the slide carrier.

These and other features, objects and advantages of the present invention will be more fully apparent from the following detailed description set forth below when taken in conjunction with the accompanying drawings.

DETAILED DESCRIPTION OF THE PREFERRED EMBODIMENT

Figure 6:
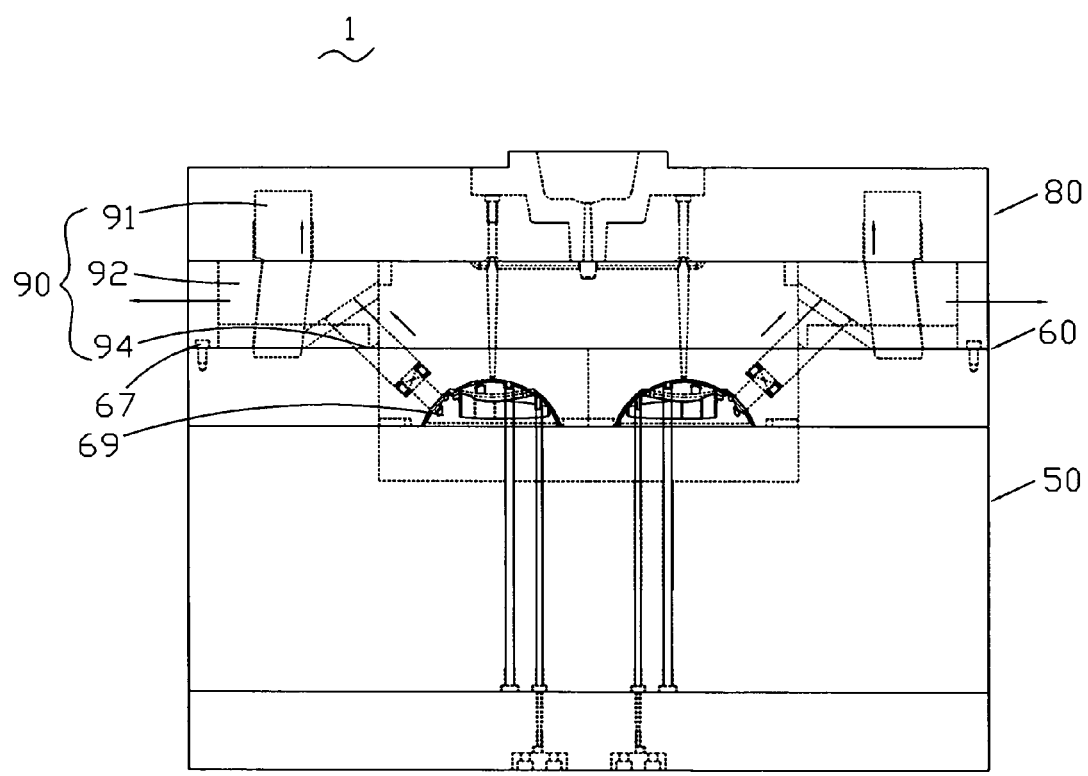
FIG. 6 is a schematic view showing an injection mold using the side-action mechanism according to the present invention closed.

With reference to FIG. 6, an injection mold 1 generally includes a core half 50 and a cavity half cooperates with the core half 50. The cavity half has a top clamping plate 80 and a cavity plate 60.

Figure 1:
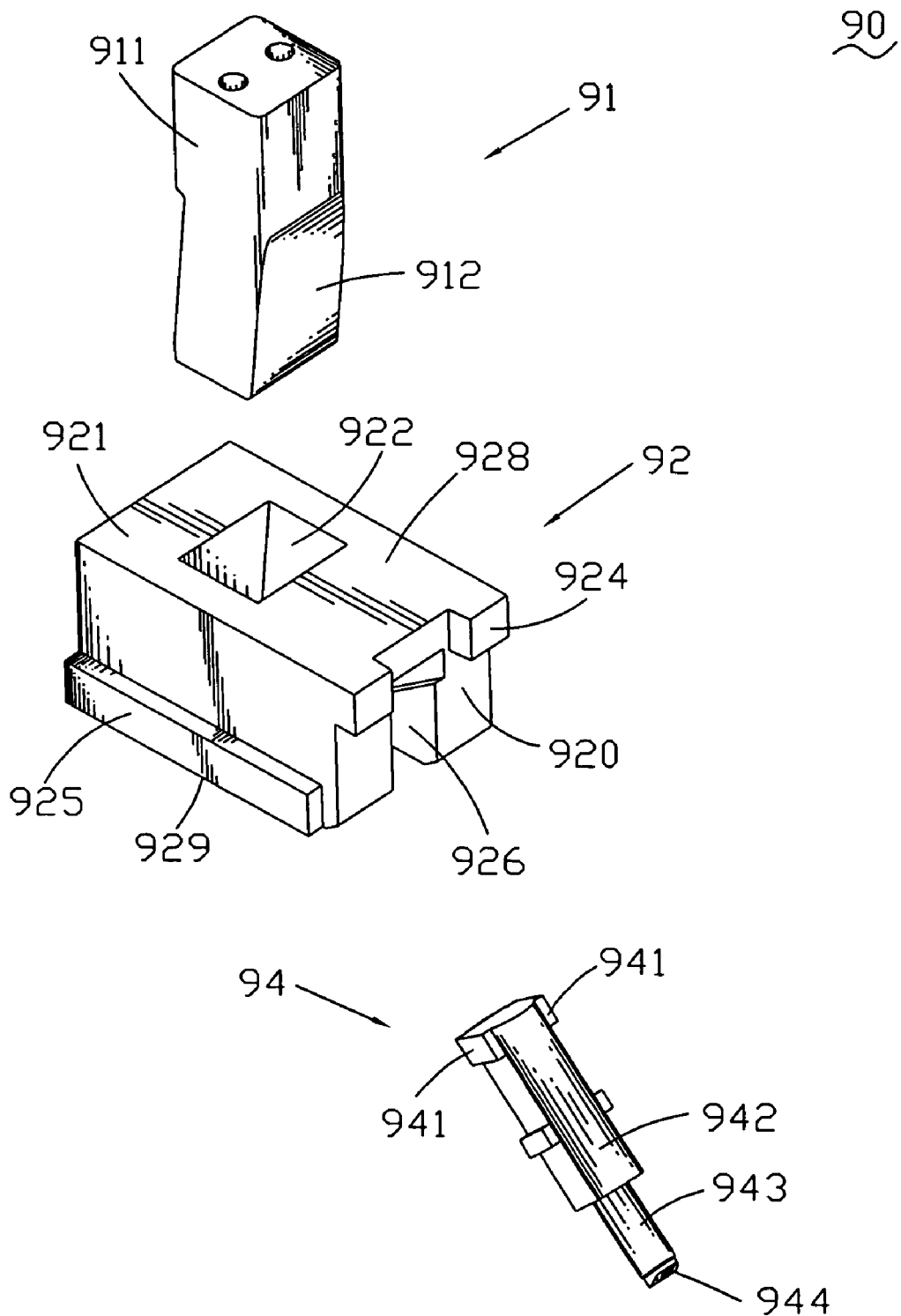
FIG. 1 is an exploded view of a side-action mechanism according to the present invention.
Figure 2:
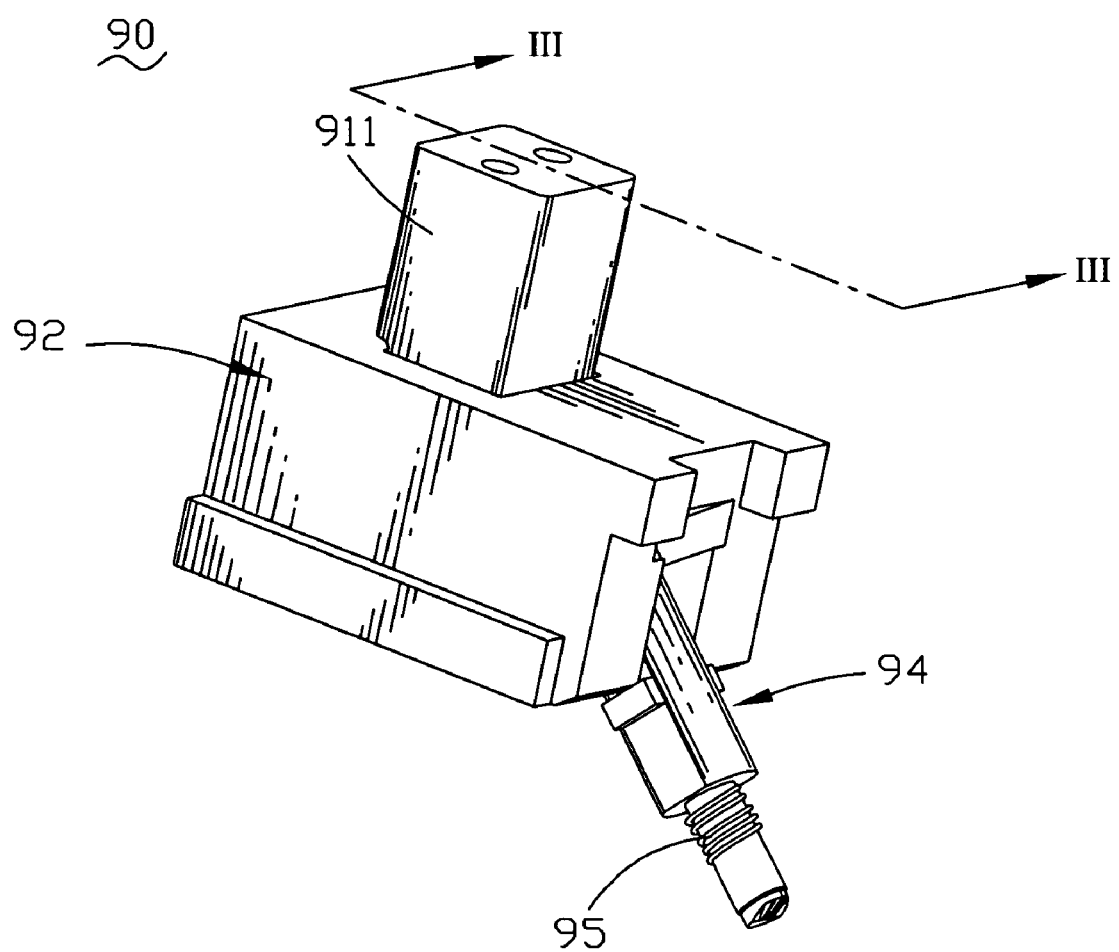
FIG. 2 is an assembled perspective view of the side-action mechanism.
Figure 3:
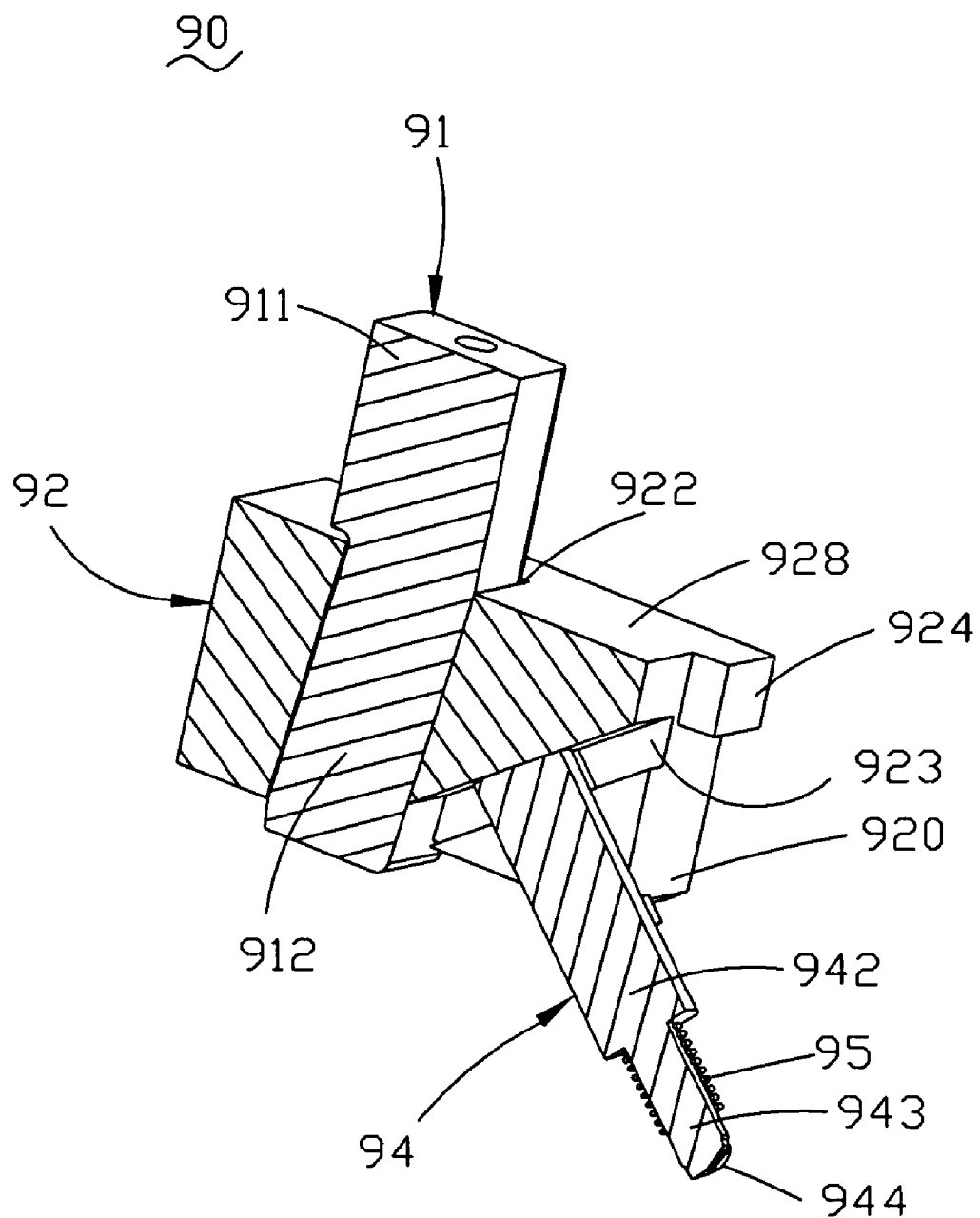
FIG. 3 is a side section view of FIG. 2 along line III-III.

In FIG. 1, FIG. 2 and FIG. 3, a side-action mechanism 90 which accommodated in the cavity plate 60 is illustrated. The side-action mechanism 90 includes a slide carrier 92, an insert core 91 inserted in the slide carrier 92 and a core pin 94 cooperating with the slide carrier 92.

The slide carrier 92 is a cuboid block which includes a top surface 928, a bottom surface 929 opposing to the top surface 928, and a front surface 920 between the top surface 928 and the bottom surface 929. An angular slide groove 922 perforates through the slide carrier 92 from the top surface 928 to the bottom surface 929. An opening 926 is formed and makes communication between the front surface 920 and bottom surface 929. A slide way 923 defined on the top of the opening 926. A pair of shoulders 924 protrudes forwards from the front surface 920. Both lengthwise side surfaces of the slide carrier 92 define a slide bar 925 longwise at its lower end.

The insert core 91 includes a secured portion 911 for securing the insert core 91 to the top clamping plate 80 and an angular insert portion 912 extends downwards from the secured portion 911. In addition, the shape of the angular insert portion 912 conforms to the angular slide groove 922. More particularly, the angular slide groove 922 is small enough to snugly fit the angular insert portion 912, but large enough to allow sliding movement in the angular slide groove 922 with minimal friction.

The core pin 94 includes a body 942, which is small enough to be accommodated in the opening 926 of the slide carrier 92, and long enough to protrude out of the opening 926. The body 942 at one end defines a pair of ears 941 thereof for engaging with the slide way 923. Therefore, the core pin 94 can slide along the slide way 923. The core pin 94 further defines a pair of barbs 945 on both sides near the free end of the body 942. An arm 943 projects straight along the lengthwise direction of the core pin 94 with a spring 95 encircling it and further forms a core element 944 at its free end.

Figure 4:
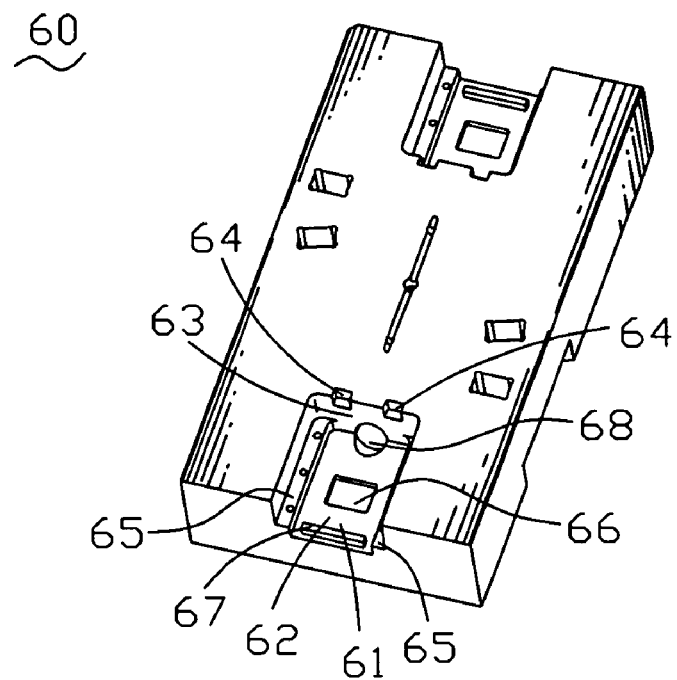
FIG. 4 is a perspective view of a cavity plate.
Figure 5:
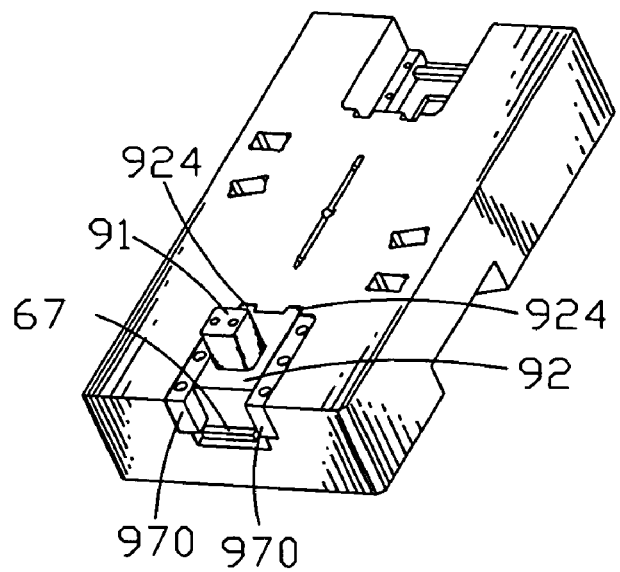
FIG. 5 is a perspective view of a cavity palate with the side action mechanism accommodated therein.

The slide carrier 92 is accommodated in the cavity plate 60. The cavity plate 60 according to the present invention shown in FIG. 4 and FIG. 5 defines two recesses 61 at two ends for receiving the slide carriers 90 therein. The recess 61 has a flat bottom plane 62, which further forms a slot 66 therein. Two limited girders 65 are defined on both edges of the bottom plane 62. Thus, the space between the two limited girders 65 snugly fit the slide carrier 92. A stopper bar 67 is formed on the bottom plane 62 to prevent the slide carrier 92 from sliding outwards and dropping from the cavity plate 60. Two wedge portions 970 are embedded in the recess 61 adjacent to the upper portion of the slide carrier 92 and rides upon the slide bar 925 and the limited girder 65. Consequently, the slide carrier 92 is restricted by the limited girder 65 and can only move along the recesses 60. A hole 68 formed between a mold cavity 69 and the recess 61 is big enough to allow the insert core 94 to go therethrough. Two gaps 64 for receiving the shoulders 924 are formed in the in the sidewall of the recess 61.

With referring to FIG. 6, when the injection mold 1 is closed, the secured portion of the insert core 91 is secured to the top clamping plate 80 and the angular inserted portion 912 goes through the slide carrier 92 and rests in the slot 66. The shoulders 924 are accommodated in the gaps 64 respectively. The core pin 94 goes through the hole 68 and the arm 943 puts the core element 944 in the mold cavity 69. Further more, the spring 95 encircling the arm 943 is depressed and biased towards the shell of the mold cavity 69.

Figure 7:
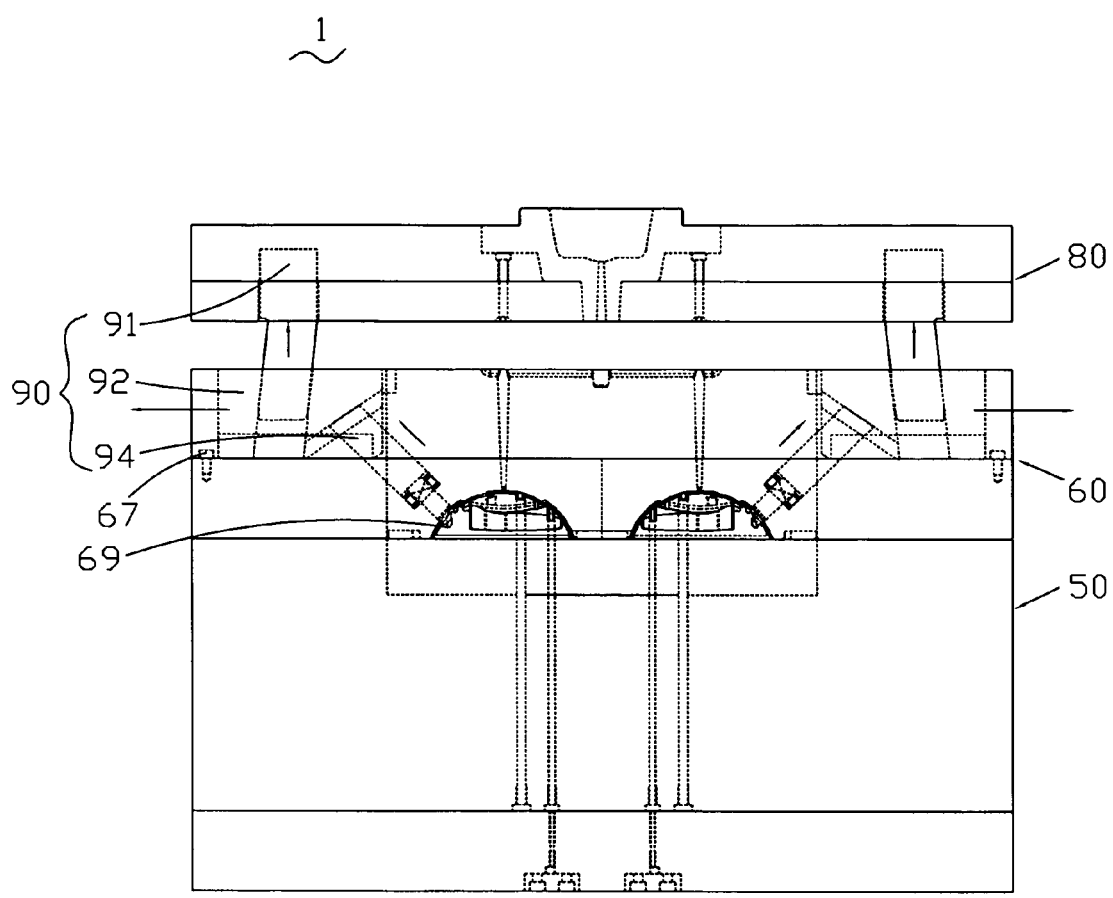
FIG. 7 is a schematic view showing the injection mold in FIG. 6 opening.
Figure 8:
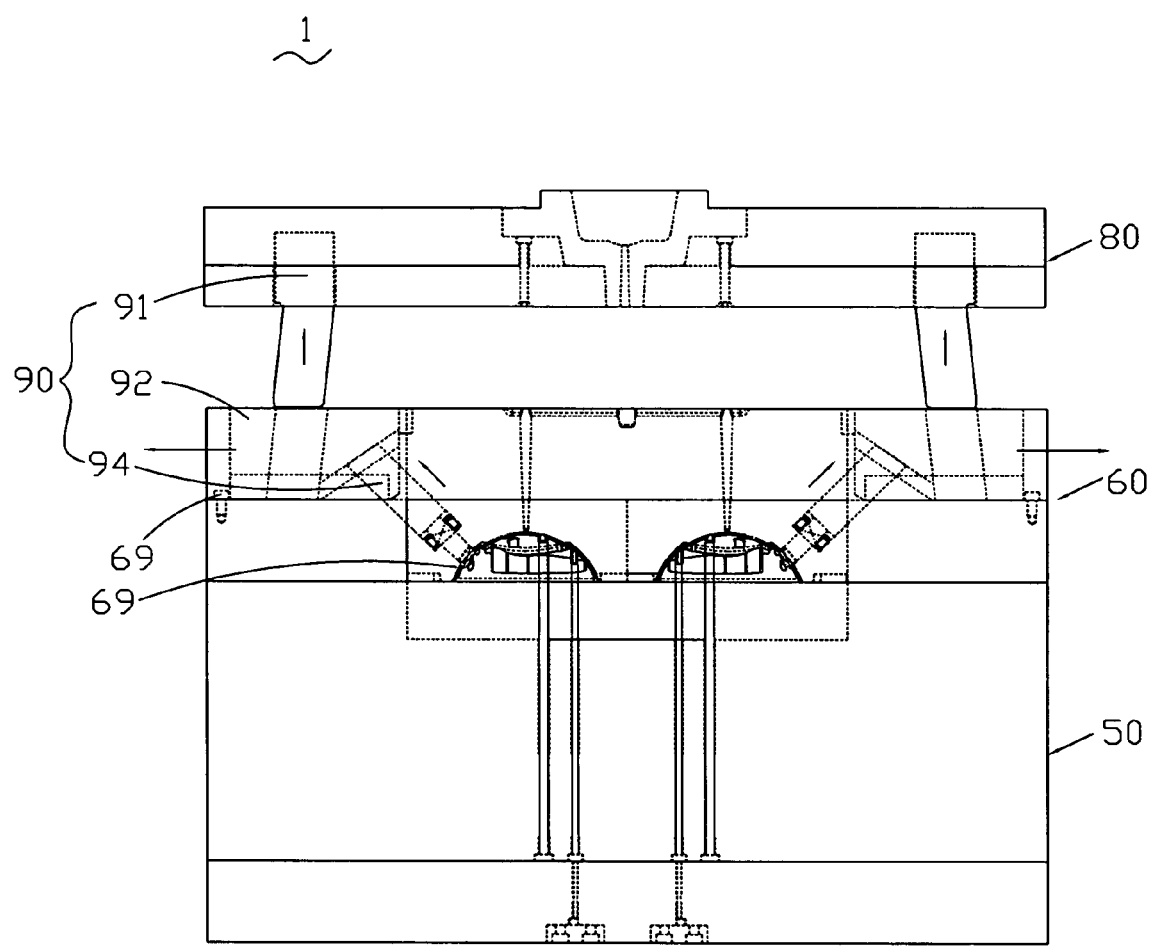
FIG. 8 is a schematic view showing the injection mold in FIG. 6 opened.
Figure 9:
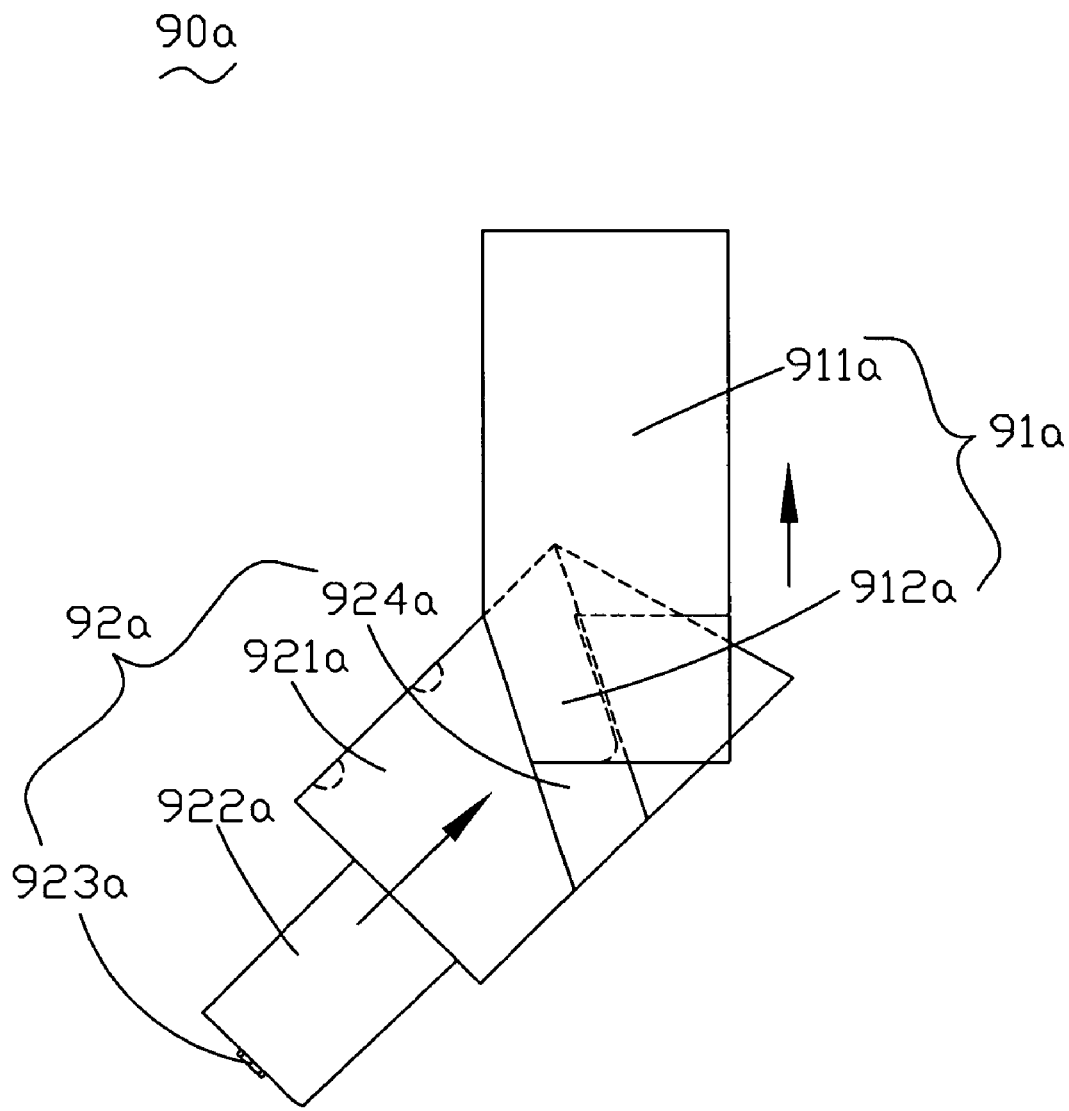
FIG. 9 is a schematic view showing a conventional side-action mechanism.

The side-action mechanism 92 transmits closing and opening longitudinal movement of the mold halves into sliding movement for the slide carrier 92 towards and away from the mold cavity 69 of the mold 1. Now refer to FIG. 7 and FIG. 8. At the opening process of the mold, the insert portion 912 of the insert core 91 withdraws from the angular slide groove 922. At the same time, the slide carrier 92 moves away from the mold cavity 69 and the core pin 94 slides along the slide way 923 upwards with the help of the depressed spring 95. As a result, the core pin 94 retracts from the mold cavity 69. In contrast, at the closing process of the injection mold 1, the insert portion 912 of the insert core 91 is inserted into the angular slide groove 922. Meanwhile, the slide carrier 92 moves towards the mold cavity 69, and the core pin 94 projects towards the mold cavity 69 and finally put the core element 944 into the mold cavity 69.

The resistance between the slide carrier 92 and the insert core 91 has been reduced by the cooperation of the insert core 91, the slide carrier 92 and the core pin 94 when compared to the prior art. As a result, the insert core 91 is easy to be inserted into the slide carrier 92 and withdrawn from the slide carrier 92.

Although a preferred embodiment of the present invention has been described in detail hereinabove, it should be clearly understood that many variations and/or modifications of the basic inventive concepts herein taught which may appear to those skilled in the present art will fall within the spirit and scope of the present invention, as defined in the appended claims.

What is claimed is:

1. A side-action mechanism comprising:
   a slide carrier having a top surface, a bottom surface opposing to said top surface, a front surface between said top surface and said bottom surface, an angular slide groove formed in said slide carrier from said top surface to said bottom surface, an opening formed and making communication between said front surface and said bottom surface, a slide way defined on the top of said opening;
   an insert core having a secured portion for securing the insert core to a top clamping plate and an angular insert portion extending downwards from said secured portion, said angular insert portion accommodated in said angular slide groove and the shape of the angular insert portion conforming to said angular slide groove;
   a core pin having a body which is small enough to be accommodated in said opening of said slide carrier, but long enough to protrude out of said opening, the body at one end defining a pair of ears thereof for engaging with said slide way, and the core pin is capable of sliding along said slide way.

2. The side-action mechanism as claimed in claim 1, wherein said angular slide groove perforates said slide carrier from said top surface to said bottom surface.

3. The side-action mechanism as claimed in claim 1, wherein the lengthwise side surfaces of said slide carrier further defines a slide bar longwise at its lower end.

4. The side-action mechanism as claimed in claim 1, further comprising an arm of said core pin projecting straight along the lengthwise direction of said core pin, and forming a core element at its free end.

5. The side-action mechanism as claimed in claim 4, further comprising a spring provided encircling said arm.

6. The side-action mechanism as claimed in claim 1, wherein said slide carrier further comprises a pair of shoulders protruding forwards from said front surface.

* * * * *